United States Patent
Self

[15] 3,689,026
[45] Sept. 5, 1972

[54] PLUG VALVE

[72] Inventor: Richard E. Self, 3221 Brimhall Drive, Los Alamitos, Calif. 90720

[22] Filed: May 27, 1971

[21] Appl. No.: 147,429

[52] U.S. Cl. ..................251/160, 251/188, 251/192, 251/309
[51] Int. Cl..............................................F16k 25/00
[58] Field of Search......251/160, 162, 163, 177, 183, 251/188, 192, 309

[56] References Cited

UNITED STATES PATENTS

| | | | |
|---|---|---|---|
| 2,501,635 | 3/1950 | Schmidt | 251/163 |
| 3,306,571 | 2/1967 | Bussi | 251/160 X |
| 3,575,376 | 4/1971 | Arvidson | 251/160 X |

*Primary Examiner*—Harold W. Weakley
*Attorney*—Hill, Sherman, Meroni, Gross & Simpson

[57] ABSTRACT

A valve structure capable of isolating substantial fluid pressure including a valve seat, a pair of grooved lugs which cooperate with a plug element supported on a pair of flexible arms such that the arms bring the plug element into camming engagement with first one and then the other of the grooved lugs to thrust the plug element securely against the valve seat, and a flow tube which carries an abutment to further thrust the plug element against the valve seat. In the open position of the valve, a flow tube is provided which communicates with the valve seat to provide an unimpeded flow path between inlet and outlet, the arrangement being such that access is provided through the entire valve body in the open position of the valve.

14 Claims, 5 Drawing Figures

INVENTOR.
RICHARD E. SELF

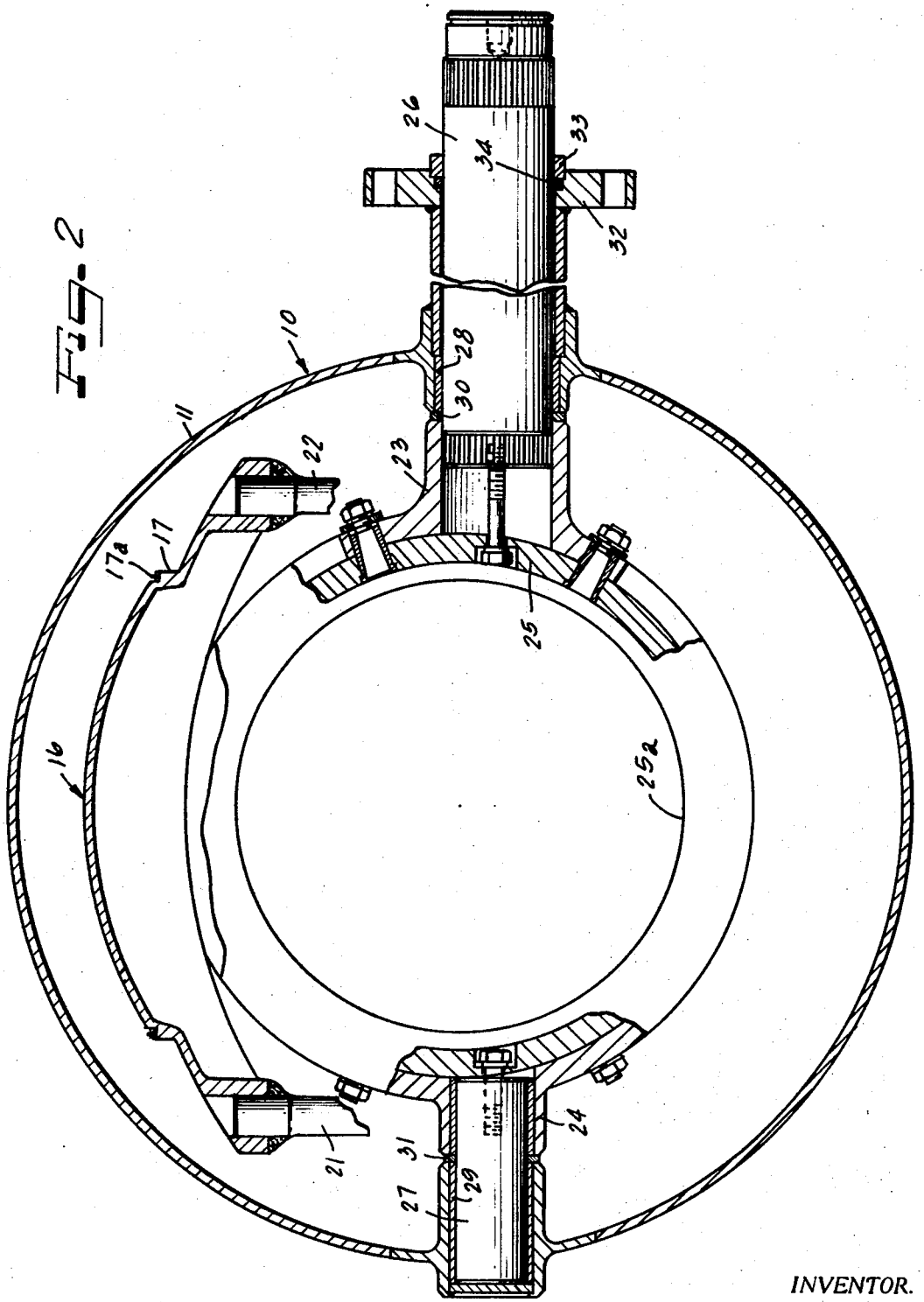

INVENTOR.
RICHARD E. SELF

PLUG VALVE

BACKGROUND OF THE INVENTION

While single seated globe valves can be made with positive shut off, they generally suffer from reduced flow capacities and have an obstructed through passage. Ball, plug or gate valves while having extremely high flow capacities, generally present extreme difficulty if required to shut off tight at either high or low temperatures. Butterfly valves, while offering some improved shut off capability over the ball or gate valves present a reduced flow capacity as compared to the ball and gate valve and also have an obstructed through passage.

Fairly recently, a new type of valve known as an eccentric rotating plug valve has been introduced, this valve including a plug element which is joined to an actuating shaft, with the center of the seating surfaces on the plug element being offset from the shaft axis. The plug element is joined to the shaft by means of a pair of arms, each of which has a notch therein which permits flexing of the arms as the plug begins to seat. This type of valve, however, is limited in applicability because of the difficulties in attaining concentric alignment of the plug and seat. The presence of the notch in each of the arms permits flexing in only one plane and when the plug element pushes against the seat, it is locked against motion normal to the plane of rotation and frequently will not seat entirely all around the periphery of the plug element. The mechanical discontinuity provided by the notches also provides weak points in the two support arms close to the shaft. Such valves also must be made to very close tolerances. Also, because of the presence of a through shaft this type valve does not permit the free passage of equipment through the valve.

The provision of valves for extreme environments such as cryogenic or high temperature fluids poses particular problems. First of all, the valve must withstand very substantial thermal distortions which means that unless very substantial loading forces are present on the valve seating element, seat leakage will occur. Secondly, it would be desirable to provide a valve having a high flow capacity which approximates that of the connecting pipe. Thirdly, it would be desirable to provide a valve which in the open position would permit unobstructed access through the body of the valve. For example, it would be desirable to lower a submersible pump or the like through the valve structure in some instances, but butterfly or globe valves, of course, are not provided with unimpeded passages through the valve body so as to accommodate this possibility.

SUMMARY OF THE INVENTION

The present invention provides an improved valve including a housing, a circular valve seat formed in conjunction with the housing, and a pair of grooved lugs spaced inwardly from the periphery of the valve seat. A shaft is arranged for rotation on the housing, and a flow tube is secured to the shaft. With the flow tube in coaxial alignment with the circular valve seat, a substantially unimpeded flow path is provided through the valve which not only provides for better flow characteristics for the fluid, but also provides an access means through the valve since no mechanical obstructions then exist between the inlet and the outlet ends of the valve. A plug element, or poppet, is supported on a pair of spaced arms which rotate with the shaft and flow tube, the arms being disposed on opposite sides of the hollow flow tube. The arm assembly is eccentrically mounted with respect to the valve seat such that rotation of the shaft brings the plug element into camming engagement first with one and then the other of the grooved lugs to both thrust forward and seat the plug element concentric against the valve seat. An abutment means is also positioned along the outer periphery of the flow tube to thrust the plug element forward upon camming engagement of the plug with the grooved lugs to provide adequate seating thrust and a completely positive locking action in the closed position of the valve.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

FIG. 2 is a vertical cross-sectional view of the valve assembly in the open position;

DESCRIPTION OF THE PREFERRED EMBODIMENTS

Figure 1:
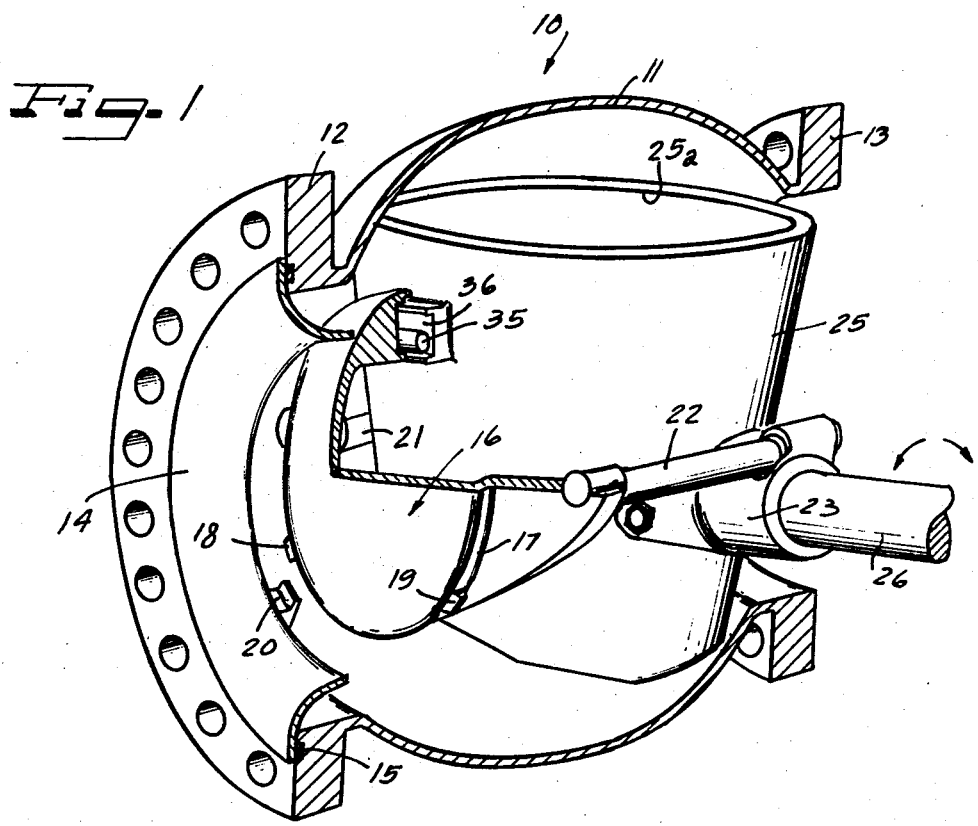
FIG. 1 is a view in perspective of an improved valve assembly produced according to the present invention, partially broken away to illustrate the interior construction more completely.
Figure 4:
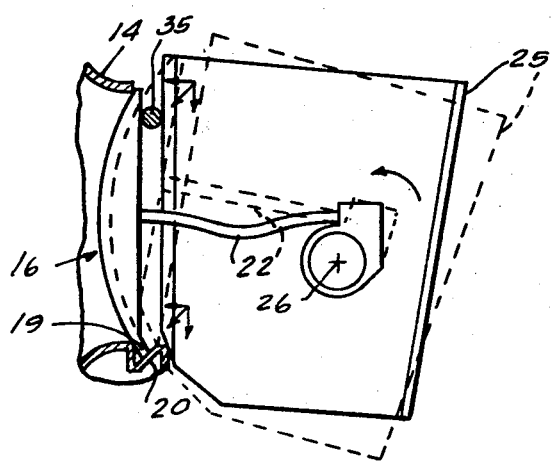
FIG. 4 is a somewhat schematic view of the valve closure elements, the dashed lines indicating the position of the valve elements at the initiation of the valve closing, and the solid line figure illustrating the fully closed position of the valve elements.
Figure 3:
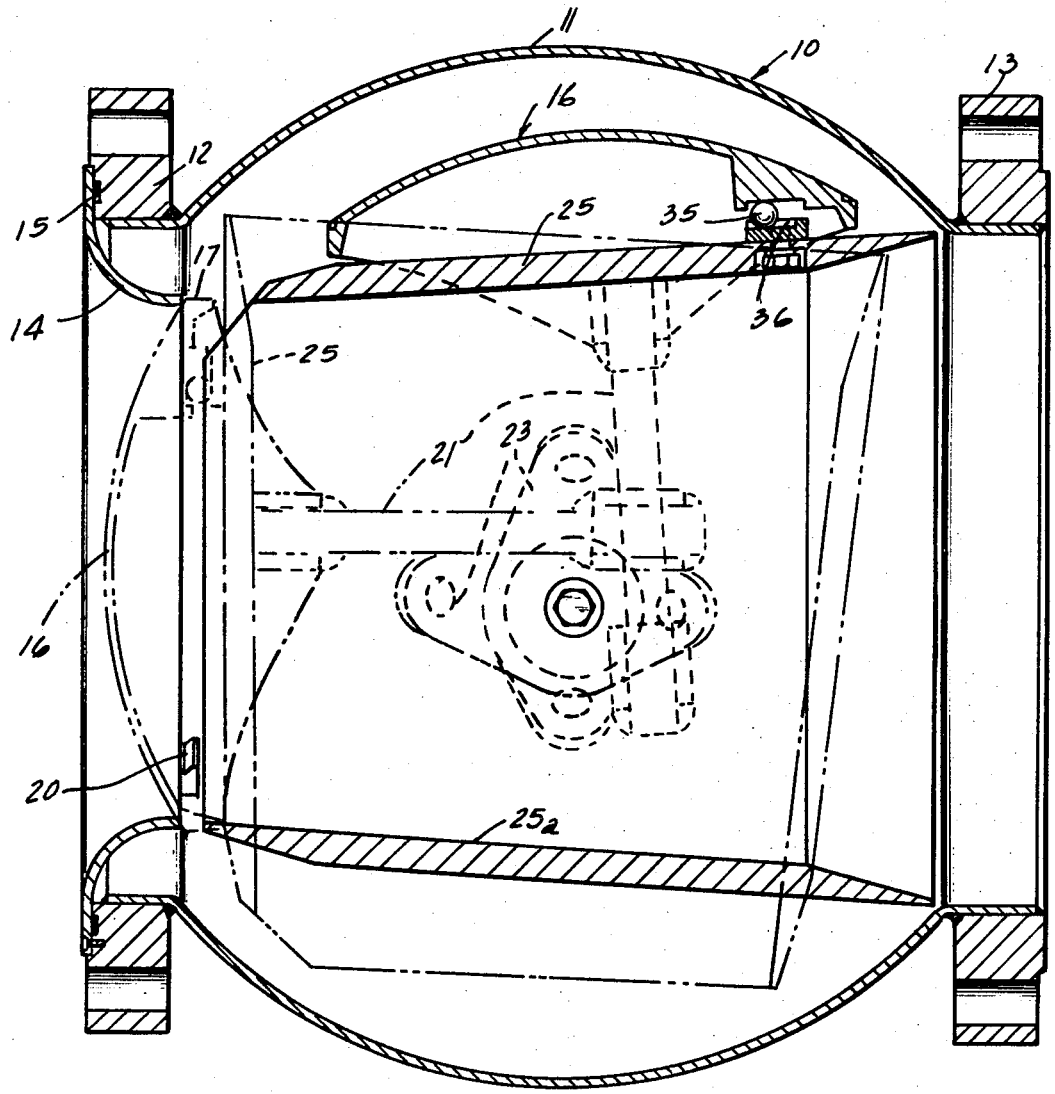
FIG. 3 is another cross-sectional view of the valve assembly, with the elements shown in solid lines in the open position of the valve, and in dashed lines to show the closed position of the valve.

In FIG. 1, reference numeral 10 indicates generally a valve structure of the type with which the present invention is concerned. The valve structure 10 includes an outer housing 11 being provided with a pair of opposed circular flange portions 12 and 13, respectively, for securing the valve housing to the pressurized space in which it is to be located. For convenience, we will refer to the end of the valve at the flange 12 as being the inlet end and that at the flange 13 as being the outlet end. A bell mouth seating ring 14 is secured to the inner periphery of the flange 12 and is separated therefrom by means of a gasket 15. As best illustrated in FIGS. 1 and 3, the seating ring 14 has a generally circular contour, constituting about one-fourth of the circumference of a circle.

The valve closure element, partially broken away in FIG. 1, consists of a plug element or poppet generally indicated at numeral 16 in the drawings. The outer or seating face of the plug element 16 has a periphery 17 with a plastic seal ring 17a (FIG. 2) for seating on the seating ring 14 and carries a pair of tapered lugs 18 and 19 spaced along its outer periphery, as best illustrated in FIG. 1. These lugs 18 and 19 are arranged to engage a pair of grooved lugs 20 spaced apart along the inner periphery of the seating ring 14 by the same angular distance as the lugs 18 and 19 are spaced along the periphery of the plug element 16.

The plug element 16 is supported by means of a pair of cylindrical metal rods 21 and 22 which are axially rigid but somewhat longitudinally resilient to permit flexing along their length during the seating of the plug, as will be explained hereinafter in more detail.

The rods 21 and 22 at one end are fixedly secured by welding or other means to the plug element 16 as shown in FIG. 2, while at their opposite ends, the rod 22 is also fixedly secured to a collar 23, and the rod 21 is also fixedly secured to a collar 24. The rods 21 and 22 are disposed on opposite sides of a flow tube 25 which in the illustrated instance takes the form of a hollow truncated cone but depending upon the design of the other portions of the valve, it can be cylindrical or the like. As best illustrated in FIG. 3, the flow tube 25 when in the open position, that is, with its axis being in line with the axis of the seating face 14, the inner surface of the flow tube 25, identified at reference numeral 25a, provides a generally tapered wall structure for directing fluid from the inlet end to the outlet end of the valve assembly.

The flow tube 25 as well as the plug element 16 are mounted for rotation by means of a pair of shafts, one shaft 26 being received within the collar 23, and a stub shaft 27 being received within the collar 24. Suitable bearings such as running bearings 28 and 29, as well as thrust bearings 30 and 31 permit relative rotative movement between the shafts and the remainder of the housing. The shaft 26 may extend through a mounting flange 32 on which there is provided a bearing 33 and a seal 34. The outer end of the shaft 26 may be splined or otherwise configured to be readily connectible to a driving element such as a motor.

To complete the description of the mechanical elements in the assembly, the rear face of the plug element 16 is arranged to engage a roller 35 confined within a channel 36 which is secured to the outer periphery of the flow tube 26, as best illustrated in FIG. 3. The cylindrical roller 35 is located substantially on the diameter of the plug element 16 which bisects the angular positions of the lugs 18 and 19, as seen in FIG. 1.

The arms 21 and 22 are mounted eccentrically with respect to the axis of the seating ring 18 to exert forces on the plug pressing it against the seating ring. Since the rods are rigid axially, they will not be compressed under pressures tending to unseat the plug and a solid backup support is provided for the plug. However, since the rods or arms are also flexible along their length they will accommodate conical movements at the ends thereof which are seated in the plug to permit the eccentric shifting of the arms after the swinging movement of the plug is arrested. The eccentric throw of the arms after swinging movement of the plug is arrested provides a concentric and tight camming of the plug against its seat.

Figure 5:
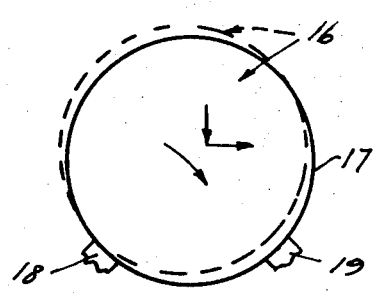
FIG. 5 is a somewhat schematic view illustrating the forces involved on the seating face of the valve element during the camming and centering action involved in seating.

In operation, as the shaft 26 is rotated in the valve closing position, the lug 18 is received within one of the grooved lugs 20, and the lug 19 on the plug element 16 is close to, but not centered in its associated grooved lug 20. Then, further rotation of the shaft causes the camming action to occur as illustrated in FIG. 5. The arrows in the figure illustrate that the rotational movement of the plug element 18 is resolved into two forces, one acting in the vertical downward direction and the other acting horizontally to seat the plug element, at its lower periphery, securely against the seating ring 14. Additional rotary movement of the shaft 26 then urges the cylinder 35 tightly against the upper periphery of the plug element 16 and thrusts it forward to further secure the engagement between the plug element and its seat.

When the shaft 26 is rotated in the opposite direction to unseat the valve, a predetermined angular movement of the shaft will cause the flow tube 25 to be placed in juxtaposition with the seating ring 14, and with the outlet port appearing at the flange 13. The flow channel thus provided is completely unimpeded by any mechanical elements since all of the plug closure elements and supporting means are located outside the flow tube as illustrated in FIGS. 1 and 3. Accordingly, not only is there an unimpeded flow path provided for fluid, but there is a completely open passageway through the valve body for access to the pressure chamber in which the valve is located.

I claim as my invention:

1. A valve comprising a housing having an inlet and an outlet, a circular valve seat, a pair of grooved lugs spaced inwardly from the periphery of said valve seat, a shaft arranged for rotation on said housing, a flow tube secured to said shaft and arranged to provide a substantially unimpeded flow path with said inlet and outlet when said flow tube is coaxially aligned with said valve seat, a pair of spaced arms rotatable with said shaft and disposed on opposite sides of said flow tube, a plug element supported at the ends of said spaced arms, said arms being eccentrically mounted with respect to the axis of said shaft such that rotation of said shaft brings said plug element into camming engagement first with one and then the other of said grooved lugs to both thrust and seat the plug element concentrically and securely against said valve seat.

2. The valve of claim 1 in which said spaced arms are sufficiently flexible to permit such camming engagement.

3. The valve of claim 1 which includes an abutment element carried by said flow tube and engageable with the back of said valve element to hold said plug element in seated engagement with said valve seat.

4. The valve of claim 3 in which said abutment comprises a cylindrical roller.

5. The valve of claim 1 in which said flow tube is in the form of a hollow truncated cone.

6. The valve of claim 1 in which said plug element has a pair of lugs thereon arranged to be received in said grooved lugs upon rotation of said shaft to initiate the camming action.

7. The valve of claim 1 in which the arms are on diametrically opposite sides of the tube and said tube transmits driving torque from the shaft to the diametrically opposed arm 8. The valve of claim 3 in which said abutment means is positioned to tilt the plug element forward upon camming engagement of said plug element with said grooved lugs.

9. A plug valve which comprises a housing, a valve seat located in said housing, shaft means journalled for rotation within said housing on an axis normal to the axis of said seat, arms carried by said shaft means projecting laterally therefrom in offset relation to the axis thereof, a plug mounted on said arms to swing from a position uncovering said seat to a position sealed against said seat, said arms being axially rigid but flexible along the length thereof to accommodate eccentric loading of the plug against its seat by the offset relation of the arm mounting relative to the axis of the shaft means, and means arresting swinging of the plug when it is aligned with the valve seat.

10. The valve of claim 9 wherein the arms are rigid metal rods accommodating conical movement of the ends thereof adjacent the plug.

11. The valve of claim 9 wherein the means for arresting swinging of the plug are lug means at the periphery of the valve seat.

12. The valve of claim 11 wherein the plug has lug means cooperating with the lug means on the valve seat for camming the plug against the valve seat.

13. The valve of claim 9 wherein the valve seat has a pair of grooved lugs spaced apart along the inner periphery thereof to bottom the valve plug and the valve plug has interfitting lugs camming against the grooved lugs for forcing the plug against the valve seat.

14. The valve of claim 13 wherein one of the plug lugs seats first in one of the grooved lugs on closing of the valve and the plug then rotates to engage the other lug in the remaining grooved lug.

* * * * *